(12) United States Patent
Boulton et al.

(10) Patent No.: US 11,157,611 B2
(45) Date of Patent: Oct. 26, 2021

(54) BINARY IMAGE STACK COOKIE PROTECTION

(71) Applicant: BlackBerry Limited, Waterloo (CA)

(72) Inventors: Adam John Boulton, Wirral (GB); Benjamin John Godwood, Chipping Norton (GB)

(73) Assignee: Blackberry Limited, Waterloo (CA)

( * ) Notice: Subject to any disclaimer, the term of this patent is extended or adjusted under 35 U.S.C. 154(b) by 351 days.

(21) Appl. No.: 16/129,313

(22) Filed: Sep. 12, 2018

(65) Prior Publication Data

US 2019/0205526 A1    Jul. 4, 2019

Related U.S. Application Data

(60) Provisional application No. 62/612,972, filed on Jan. 2, 2018.

(51) Int. Cl.
| | |
|---|---|
| *G06F 21/52* | (2013.01) |
| *G06K 9/62* | (2006.01) |
| *G06F 21/57* | (2013.01) |
| *G06F 21/12* | (2013.01) |
| *G06F 21/54* | (2013.01) |
| *G06F 21/56* | (2013.01) |

(52) U.S. Cl.
CPC ............ *G06F 21/52* (2013.01); *G06F 21/125* (2013.01); *G06F 21/54* (2013.01); *G06F 21/566* (2013.01); *G06F 21/577* (2013.01); *G06K 9/628* (2013.01)

(58) Field of Classification Search
CPC ........ G06F 21/52; G06F 21/125; G06F 21/54; G06F 21/566; G06F 21/577; G06K 9/628
See application file for complete search history.

(56) References Cited

U.S. PATENT DOCUMENTS

| | | | | |
|---|---|---|---|---|
| 6,427,234 B1 * | 7/2002 | Chambers | ........... | G06F 9/45516 717/140 |
| 7,581,089 B1 * | 8/2009 | White | ................. | G06F 9/30054 712/242 |
| 7,716,495 B2 * | 5/2010 | Shupak | .................... | G06F 21/52 713/193 |
| 8,196,110 B2 * | 6/2012 | Cabrera Escandell | . | G06F 21/54 717/126 |
| 9,245,110 B2 * | 1/2016 | Deutschle | ............... | G06F 21/52 |
| 2004/0255146 A1 * | 12/2004 | Asher | ..................... | G06F 21/52 726/16 |
| 2007/0006170 A1 | 1/2007 | Hasse et al. | | |

(Continued)

OTHER PUBLICATIONS

Cowan et al. StackGuard: Automatic Adaptive Detection and Prevention of Buffer-Overflow Attacks. 1998, USENIX, (Year: 1998).*

(Continued)

*Primary Examiner* — Samson B Lemma
*Assistant Examiner* — Abdullah Almamun
(74) *Attorney, Agent, or Firm* — Daniel J. Henry; Bejin Bieneman PLC

(57) ABSTRACT

A computer includes a memory and a processor programmed to execute instructions stored in the memory. The instructions include identifying a function in a binary file, assigning one of a plurality of classifications to the function, and determining that the function requires stack cookie protection based at least in part on the classification assigned to the function.

20 Claims, 6 Drawing Sheets

(56) References Cited

U.S. PATENT DOCUMENTS

| | | | | |
|---|---|---|---|---|
| 2009/0165135 | A1* | 6/2009 | Lomont | G06F 21/566 |
| | | | | 726/22 |
| 2012/0144480 | A1* | 6/2012 | Miller | G06F 21/6218 |
| | | | | 726/22 |
| 2013/0013965 | A1* | 1/2013 | Guillemin | G06F 21/52 |
| | | | | 714/48 |
| 2013/0283245 | A1* | 10/2013 | Black | G06F 9/44589 |
| | | | | 717/130 |
| 2014/0359773 | A1* | 12/2014 | Matthews | G06F 21/54 |
| | | | | 726/24 |
| 2015/0220731 | A1 | 8/2015 | Christodorescu et al. | |
| 2016/0028767 | A1* | 1/2016 | Ripoll | G06F 21/52 |
| | | | | 726/23 |
| 2017/0364452 | A1* | 12/2017 | Okhravi | H04L 9/0894 |
| 2019/0205542 | A1* | 7/2019 | Kao | G06Q 10/0635 |
| 2020/0125378 | A1* | 4/2020 | Tshouva | G06F 21/52 |
| 2020/0371945 | A1* | 11/2020 | Peles | G06F 21/6218 |

OTHER PUBLICATIONS

Shehab Gamal et al., "Buffer Overflow Vulnerability Detection in the Binary Code", Jan. 1, 2011 (Jan. 1, 2011), XP055534085, URL:https://pdfs.semanticscholar.org/ca15/52428d06ba6cdccf02c10f3c348813d96258.pdf, 9 pages.
International Search Report and Written Opinion of International Searching Authority in PCT/EP2018/081963 dated Dec. 21, 2018, 14 pages.

* cited by examiner

BINARY IMAGE STACK COOKIE PROTECTION

CROSS-REFERENCE TO RELATED APPLICATIONS

This application claims priority to U.S. Provisional Patent Application No. 62/612,972 titled "Detecting stack cookie utilization in a binary software component using binary static analysis" and filed on Jan. 2, 2018, the contents of which are hereby incorporated by reference in their entirety.

BACKGROUND

An execution stack (also referred to as simply a "stack") is a section of memory used to store information about the current execution context of a software program. For example, the stack of a software program may include information about the currently executing function (known as the function's "stack frame") such as local variables, a return address indicating the function that called the currently executing function (to which control is to be returned when the currently executing function finishes), and other information.

A binary file is a type of computer file in a computer-readable format. Rather than store data as text, a binary file stores data as a string of binary digits, such as a sequence of bytes. Computer code, in human-readable format, can be compiled into a binary file so the computer code can be executed by the computer. While not typically stored in a human-readable format, the data in a binary file can be represented as text in formats such as hexadecimal, decimal, binary, ASCII, etc.

DETAILED DESCRIPTION

Figure 1:
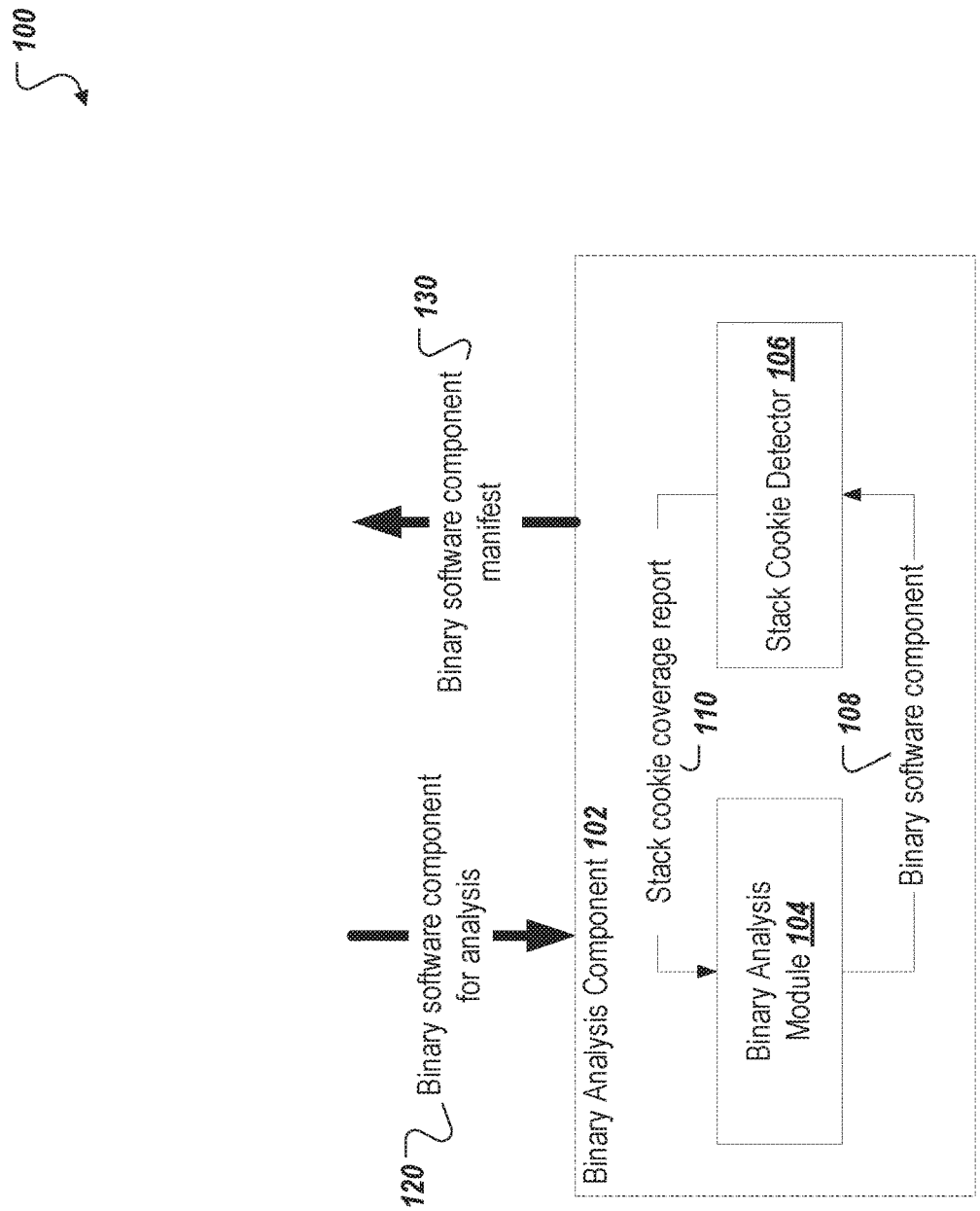
FIG. 1 is a schematic diagram showing a system that detects stack cookie utilization in a binary software component using binary static analysis, according to an implementation.

In some cases, software programs may execute in systems connected to, or accessible via, public networks such as the Internet. Malicious actors can use various exploitative techniques to influence the behavior of a network-connected software program by manipulating the program's stack. One such technique, known as a buffer overflow attack, involves an attacker sending data to a software program that does not check the size of data it receives before copying the data into a fixed size memory location (e.g., a buffer). By sending a specially formatted data string of the correct length, the attacker can overwrite the stack memory adjacent to the buffer with arbitrary data. Using this technique, the attacker can take control of the computer upon which the software program executes, and cause it to execute arbitrary instructions.

Several techniques have been developed to mitigate against such attacks. One technique, known as "stack cookies," involves placing a special value or "cookie" on the stack at a boundary between a function's local data and information (such as the return address) used to maintain the organization of the stack. When the function returns, the stack location where the cookie was stored is checked to ensure that the value has not been overwritten (e.g., by a buffer overflow attack). If the value in the stack location matches the cookie value, the stack has not been overwritten, and the program continues executing. If the value in the stack location does not match the cookie value, the stack has been overwritten and the program exits. This technique effectively prevents an attacker from utilizing a buffer overflow attack to inject arbitrary instructions, as such an attack will overwrite the cookie value and cause the program to exit before executing the injected instructions. However, if the user of the software component does not have access to its source code, which is often the case if the software is provided by an external vendor, it can be challenging for the user to verify that the software component actually implements stack cookie protection. Compiler programs used to build other software programs generally add metadata to the software programs indicating which features, such as stack cookies, are compiled into the program. However, this metadata is not always reliable, as some compilers may not include stack cookie protection in every function in a program. The metadata can also be altered to falsely indicate that stack cookie protection is included in the program.

The present disclosure describes techniques for detecting stack cookie utilization in a binary software component using binary static analysis. In one implementation, identifying a function defined in the binary software component is identified. The function includes one or more instructions. A binary static analysis of the function is performed to determine whether the function utilizes stack cookie protection based on the one or more instructions including one or more stack cookie handling instructions. Binary static analysis involves examining a binary software component (e.g., one that has been compiled) and determining characteristics of the program from its binary structure alone, without executing the binary software component or examining its source code. In response to determining that the function utilizes stack cookie protection, a security report for the binary software component is updated to indicate that the function utilizes stack cookie protection.

The present disclosure further describes a binary static analysis method of reliably identifying the presence of stack cookie (sometimes called stack canary) protection in a binary file. Some compilers provide an option for run-time detection of stack buffer overflows. If the option is enabled, the compiler stores a random value on the stack between the local variables and return address of a function. This value is the "stack cookie." A buffer overflow attack will overwrite the return address of a function as well as the stack cookie, changing the value of the stack cookie. Thus, a change in the stack cookie indicates a security threat.

When stack cookie functionality exists in a binary file, the presence of the functionality can be detected through various techniques. In one technique, the presence of stack cookie protection can be detected by matching metadata within the file header and by further determining which functions are directly leveraging the stack cookie feature. Another technique involves identifying instances when the stack cookie functionality is referenced, as the protection feature is not always applicable to every function within an application which has been compiled with such stack cookie protection.

An example computer that can analyze a binary file and determine whether stack cookie protection is required includes a memory and a processor programmed to execute instructions stored in the memory. The instructions include identifying a function in a binary file, assigning one of a plurality of classifications to the function, and determining that the function requires stack cookie protection based at least in part on the classification assigned to the function. The computer described below provides a mechanism to increase the overall software quality of a system by verifying the use of stack cookies in a binary software component rather than trusting possibly misleading indications in the component's metadata. In addition, the techniques described herein do not require access to the component's source code, allowing a user of the software to perform the verification independent of the software vendor. Further, the elements shown in the Figures and described below may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

FIG. 1 is a schematic diagram showing a system 100 that detects stack cookie utilization in a binary software component using binary static analysis, according to an implementation. The system 100 includes a binary analysis component 102 including a binary analysis module 104 and a stack cookie detector 106.

The binary analysis component 102 includes a system for performing binary static analysis on software components to determine security characteristics of the components. The binary analysis component 102 can include one or more computing devices, each having a memory and processor, executing software programs to perform the binary static analysis of software components and to determine the corresponding security characteristics. Binary static analysis involves examining the binary representation of a compiled binary software component to determine its attributes and to deduce its possible behaviors upon execution. Binary static analysis is performed without reference to the source code that was compiled to create the binary software component and is generally performed without executing the binary software component. For example, a software program can perform binary static analysis on a binary software component by examining the structure of the binary data making up the binary software component. The binary static analysis program can identify attributes of the binary software component by examining an information header included in the binary software component by the compiler that created the component. The binary static analysis program can also identify attributes of the binary software component by examining the structure of the program itself, such as, for example, by identifying functions defined in the program, APIs used by the program, compiler defensive techniques implemented in the functions defined in the program, and other features of the binary software component.

The binary analysis module 104 is software within the binary analysis component 102 that, when executed, performs the binary static analysis described above. In some cases, the binary analysis module 104 may examine the structure of a binary software component to be analyzed and may utilize other components (such as the stack cookie detector 106 discussed below) within the binary analysis component 102 to perform certain types of analysis on the binary software component. In some cases, the binary analysis module 104 may be a software component within the binary analysis component, such as a class, a library, a function, an object, or other type of software component.

The stack cookie detector 106 is software within the binary analysis component 102 that analyzes a binary software component to determine which functions defined in the binary software component implement stack cookie protection. As described in greater detail below, the stack cookie detector 106 may examine the instructions inside each function defined in the binary software component to determine whether the function includes instructions to place a stack cookie value on the stack when the function is called, and instructions to check whether the stack cookie value has been altered when the function returns. In some cases, the stack cookie detector 106 may receive as input the location of a single identified function within the binary software component and may return an indication of whether the identified function implements stack cookie protection. The stack cookie detector 106 may also receive as input a function map for the binary software component indicating the locations of functions defined within the component and may iterate through each function to produce an indication of whether the function implements stack cookie protection.

As shown, the binary analysis component 102, which is implemented via electronic components such as a processor and memory, receives a binary software component 120 for analysis. The binary software component 120 may be provided to the binary analysis component 102 by an external system, such as, for example, a software development system, software deployment system, or other systems. The binary analysis module 104 may analyze the received binary software component and provide the binary software component (shown at 108) to the stack cookie detector 106 for analysis. The stack cookie detector 106 may analyze functions defined in the binary software component to determine whether the functions implement stack cookie protection and provide a stack cookie coverage report 110 to the binary analysis module 104 including these indications.

In some cases, the stack cookie coverage report 110 may be included in a security manifest produced by the binary analysis component 102 for the binary software component. The binary analysis component 102 may provide the security manifest to an external system, as shown at 130. The external system 130 may use the security manifest to make decisions regarding the binary software component 120. For example, the external system 130 may choose not to deploy a binary software component where the security manifest indicates that the component includes functions that do not implement stack cookie protection.

Figure 2:
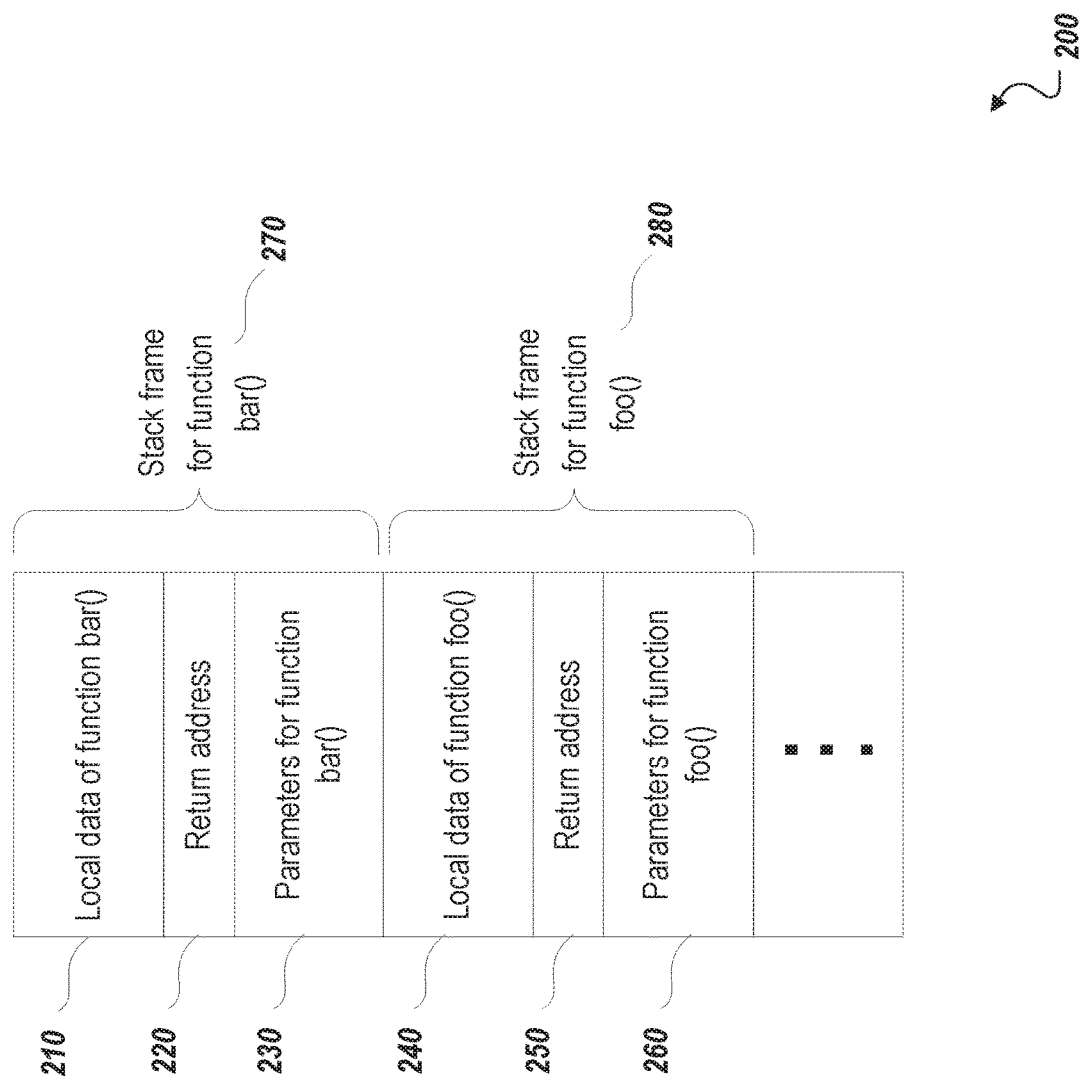
FIG. 2 illustrates an example execution stack, according to an implementation.

FIG. 2 illustrates an example execution stack 200, according to an implementation. The execution stack 200 includes stack frames 270, 280, local data 210, 240, return addresses 220, 250, and function parameters 230, 260.

The execution stack 200 represents a simplified execution stack for an executing binary software component in which a function called "foo( )" has called a function called "bar( )". Function foo( ) is associated with stack frame 280 within the execution stack 200. Stack frame 280 includes function parameters 260 that were passed to the function foo( ) when it was called (i.e., by another function). Stack frame 280 also includes a return address 250, which is a pointer to a stack frame associated with the function that called foo( ). Stack frame 280 also includes local data 240. Local data 240 includes any local variables defined in the function foo( ).

For example, if the function foo( ) defined a string of length 10, the local data 240 would include a section of memory large enough to store 10 characters and any valued copied into this string during execution would be copied into this section of memory within local data 240.

Function bar( ) is associated with stack frame 270 within the execution stack 200. Stack frame 270 includes function parameters 230 that were passed to the function bar( ) when it was called by function foo( ). Stack frame 270 also includes a return address 220, which is a pointer to a stack frame associated with the function that called bar( ). In this case, return address 220 would point to the beginning of stack frame 280 associated with function foo( ), because function foo( ) called function bar( ). When function bar( ) returns, stack cleanup instructions (including in the function epilogue for function bar( )) would read the return address 220 from the stack, remove stack frame 270 from the stack, and cause execution to jump to the address noted by return address 220. Because function foo( ) called function bar( ), this would cause execution to jump to the instruction in function foo( ) immediately after the call to function bar( ) and execution would continue inside function foo( ). Local data 210 includes any local variables defined in the function bar( ). For example, if the function bar( ) defined a string of length 10, the local data 210 would include a section of memory large enough to store 10 characters, and any valued copied into this string during execution would be copied into this section of memory within local data 210.

Figure 3:
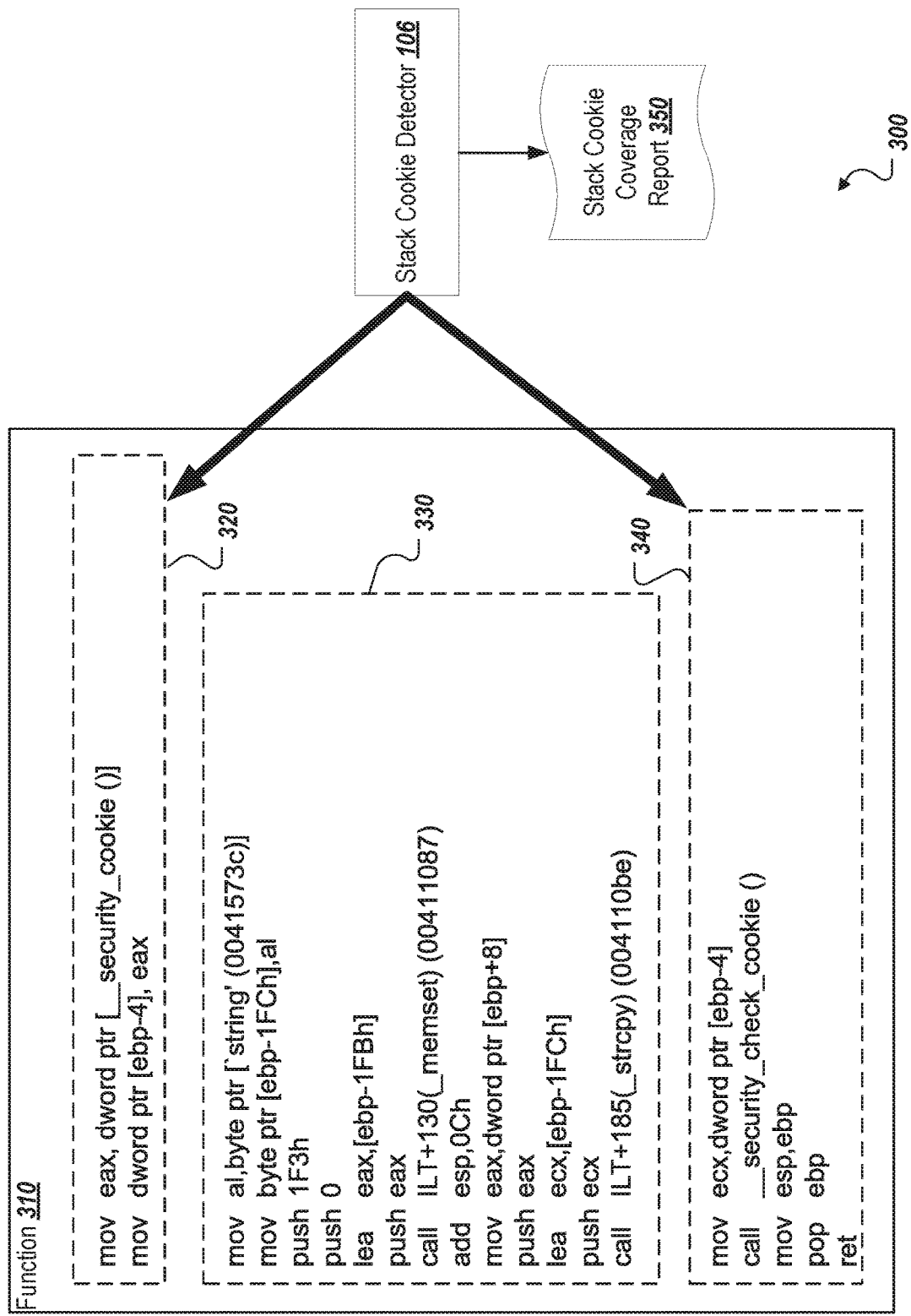
FIG. 3 illustrates an example disassembled function analyzed to determine whether it includes stack cookie protection, according to an implementation.

FIG. 3 illustrates a system 300 in which a disassembled function 310 is analyzed to determine whether it includes stack cookie protection, according to an implementation. Disassembled function 310 includes a function prologue 320, function body 330, and a function epilogue 340.

Disassembled function 310 may be function within a binary software component that has been identified using binary static analysis, as described above. As shown, function 310 includes a number of assembly language instructions. During execution of the binary software component, when function 310 is called, the assembly language instructions included in function 310 are executed. The instructions within function 310 may include instructions from one or more instruction sets, such as, for example, the ARM instruction set, the THUMB instruction, an Intel instruction set, a Zilog instruction set, or other types of instruction sets.

Function prologue 320 includes instructions that will be executed when function 310 is called during execution. In some cases, function prologue 320 includes stack cookie instructions configured to insert a stack cookie value to mark the boundary of function 310's local data within the stack. Function prologue 320 may call an external function to retrieve the stack cookie value for insertion into the stack, such as the "_security_cookie ( )" function called in the first instruction in function prologue 320.

Function epilogue 340 includes instructions that will be executed when function 310 returns after being called during execution. In some cases, function epilogue 340 includes stack cookie instructions configured to check whether the stack cookie value written to the stack by the stack cookie instructions in the function prologue 320 is still present in the stack at the boundary of function 310's local data. Function epilogue 340 may call an external function to whether the value at this stack location matches the stack cookie value written by the function prologue 320, such as the "_security_check_cookie ( )" function called in function prologue 340.

Stack cookie detector 106 may examine the function prologue 320 to determine whether it contains instructions to retrieve the stack cookie value and insert it into the stack, such as the call to "_security_cookie( )" in the function prologue 320. If the stack cookie detector 106 determines that such a stack cookie instruction is present in function 310, the stack cookie detector 106 may then examine the function epilogue to determine whether it contains instructions to retrieve the value from the expected stack cookie location within the stack and compare the retrieved value to the stack cookie value written by the instructions in the function prologue 320. In some cases, if stack cookie detector 106 determines that the function prologue 320 includes instructions to write a stack cookie to the stack, and function epilogue 340 includes instructions to retrieve and check the value of the stack cookie from the stack, stack cookie detector 106 may determine that function 310 implements stack cookie protection. Stack cookie detector 106 may then update a stack cookie coverage report 350 to indicate that function 310 implements stack cookie protection. In some cases, the stack cookie coverage report 350 may be part of a security manifest for the binary software component include function 310.

Figure 4:
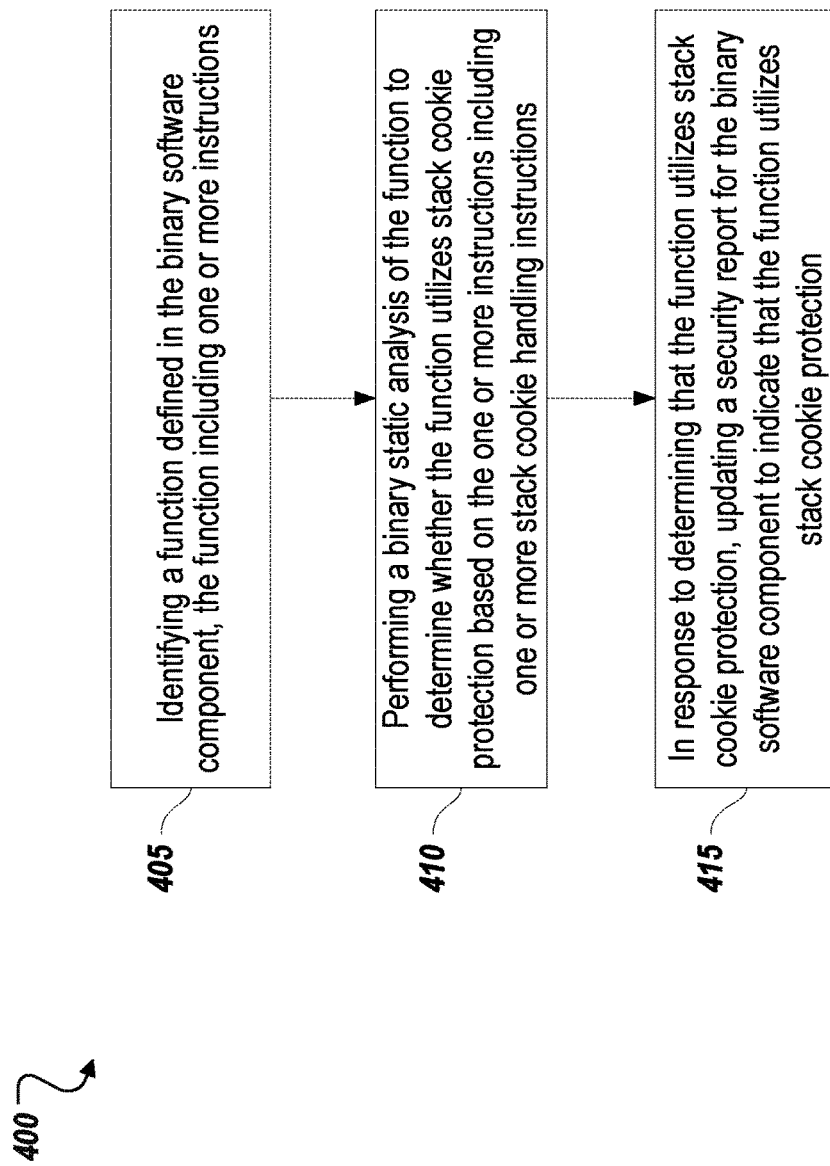
FIG. 4 is a flow diagram showing a method for detecting stack cookie utilization in a binary software component using binary static analysis, according to an implementation.

FIG. 4 is a flow diagram showing a method 400 for detecting stack cookie utilization in a binary software component using binary static analysis, according to an implementation. At 405, identifying a function including one or more instructions and defined in the binary software component is identified by a binary analysis component (e.g., 102).

At 410, a binary static analysis of the function is performed by a stack cookie detector (e.g., 106) to determine whether the function utilizes stack cookie protection based on the one or more instructions including one or more stack cookie handling instructions. In some cases, the one or more stack cookie handling instructions are configured, when executed by a processor, to insert a particular data sequence into an execution stack maintained by the processor when the function is called to mark a boundary of stack data associated with the function. The particular data sequence may be generated at compile time, or the one or more stack cookie handling instructions may include an instruction to generate the particular data sequence when the function is called. In some cases, the one or more stack cookie handling instructions are configured, when executed by the processor, to determine whether the particular data sequence remains in the execution stack when the function returns after the function is called. The one or more stack cookie handling instructions may be configured, when executed by the processor, to cause execution of the binary software component to halt in response to determining that the particular data sequence does not remain in the execution stack when the function returns.

At 415, in response to determining that the function utilizes stack cookie protection, a security report for the binary software component is updated by the stack cookie detector (e.g., 106) to indicate that the function utilizes stack cookie protection. In some cases, in response to determining that the function does not utilize stack cookie protection, a security report for the binary software component is updated to indicate that the function does not utilize stack cookie protection.

Figure 5:
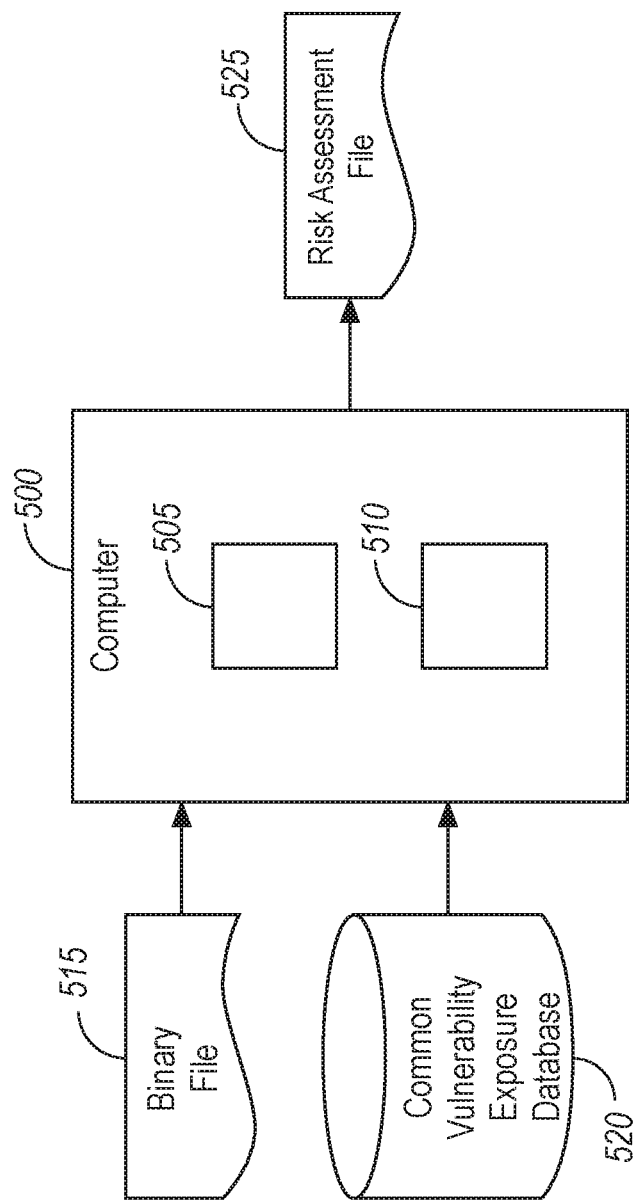
FIG. 5 illustrates an example computer programmed to evaluate binary files for security risks.

As illustrated in FIG. 5, a computer 500 includes a memory 505 and a processor 510 for processing binary files 515. The computer 500 may perform the operations discussed above with respect to FIGS. 1-4. The computer 500 receives the binary file 515 and possibly other data such as data from, e.g., a common vulnerability exposure (CVE) database 520, processes the binary file 515 in accordance with the data stored in the CVE database 520, and outputs a risk assessment file 525 including metrics representing the vulnerability of the binary file 515. The metrics in the risk assessment file 525 output by the computer 500 represent the security risk posed by the binary file 515. For example, a security risk may increase if a binary file 515 fails to implement stack cookie protection, as discussed above.

The memory 505 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 505 may store instructions executable by the processor 510 and data such as binary files 515, the CVE database 520, and the risk assessment file 525. The binary file 515 (or "binary") is a computer-readable file including data. The binary file 515 is created by compiling human-readable computer code, such as computer code written in programming languages such as C, C++, Java, etc., in a computer-readable format. The CVE database 520 is a software file including electronic data representing known security vulnerabilities associated with using certain APIs, software libraries, etc. The risk assessment file 525 is a software file that includes data representing metrics associated with the security risk posed by the binary file 515.

The processor 510 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 510 is programmed to access data stored in the memory 505, process the data, and generate data that can be stored in the memory 505, displayed on a computer monitor, transmitted to another computer or mobile device, etc.

The processor 510 is programmed to determine whether a binary file 515 is subject to a security risk based at least in part on whether the binary file 515 implements stack cookie protection. The processor 510 may be programmed to identify stack cookie protection by evaluating the functions called during execution of the binary file 515. The processor 510, for instance, may be programmed to consider four different types of functions. Further, the processor 510 may be programmed to classify each function based on its type. By way of example, one classification (referred to as "type A") may be assigned to functions that are not vulnerable to stack overflow. As such, type A functions may not require stack protection. Another classification (referred to as "type B") may be applied to functions identified by the developer as including a stack protection attribute. That is, the developer may set an attribute indicating that the function should be classified under type B. Another classification (referred to as "type C") may apply to functions that contain a local character array. Another classification (referred to as "type D") may apply to functions with one or more of the following characteristics: a local variable's address is used as part of the right hand side of an assignment or function argument, a local variable is an array (or union containing an array) regardless of the array type or length, or the function uses register local variables.

The processor 510 may be programmed to assign the classification during compiling of the file used to generate the binary file 515. Further, during compiling, the processor 510 may apply different levels of stack protection based on a setting used during compiling of the file. The settings may include an option to disable stack protection for all functions, an option to provide stack protection for all functions, an option to provide stack protection for type C functions, an option to provide stack protection for type C and type D functions, and an option to provide stack protection for type B and type C functions.

The processor 510 may be programmed to identify binary files 515 that have insufficient stack protection by, e.g., identifying certain symbols in the binary file 515. Simply looking for certain symbols, however, can result in false positives (i.e., the processor 510 improperly identifying a binary file 515 as lacking stack protection). Therefore, the processor 510 may be programmed to identify functions in the binary file 515, classify the function (i.e., assign one of the categories discussed above), determine if stack protection is present, and determine whether the current stack protection is sufficient for the analyzed function. If not, the processor 510 may be further programmed to recommend that stack protection be added to the function. If stack protection is sufficient, the processor 510 may output an indication that the stack protection for the binary is sufficient. For instance, the processor 510 may be programmed to generate the risk assessment file 525, which may include the indication of whether the binary file 515 has sufficient stack protection, requires additional stack protection, etc. The processor 510 may be further programmed to store the risk assessment file 525 in the memory 505. In some instances, the processor 510 may be programmed to output the risk assessment file 525. Outputting the risk assessment file 525 may include electronically transmitting the risk assessment file 525 via a wired or wireless network, storing the risk assessment file 525 to a memory storage device (such as a flash drive) connected to the computer 500, displaying the contents of the risk assessment file 525 on a display device, etc.

Figure 6:
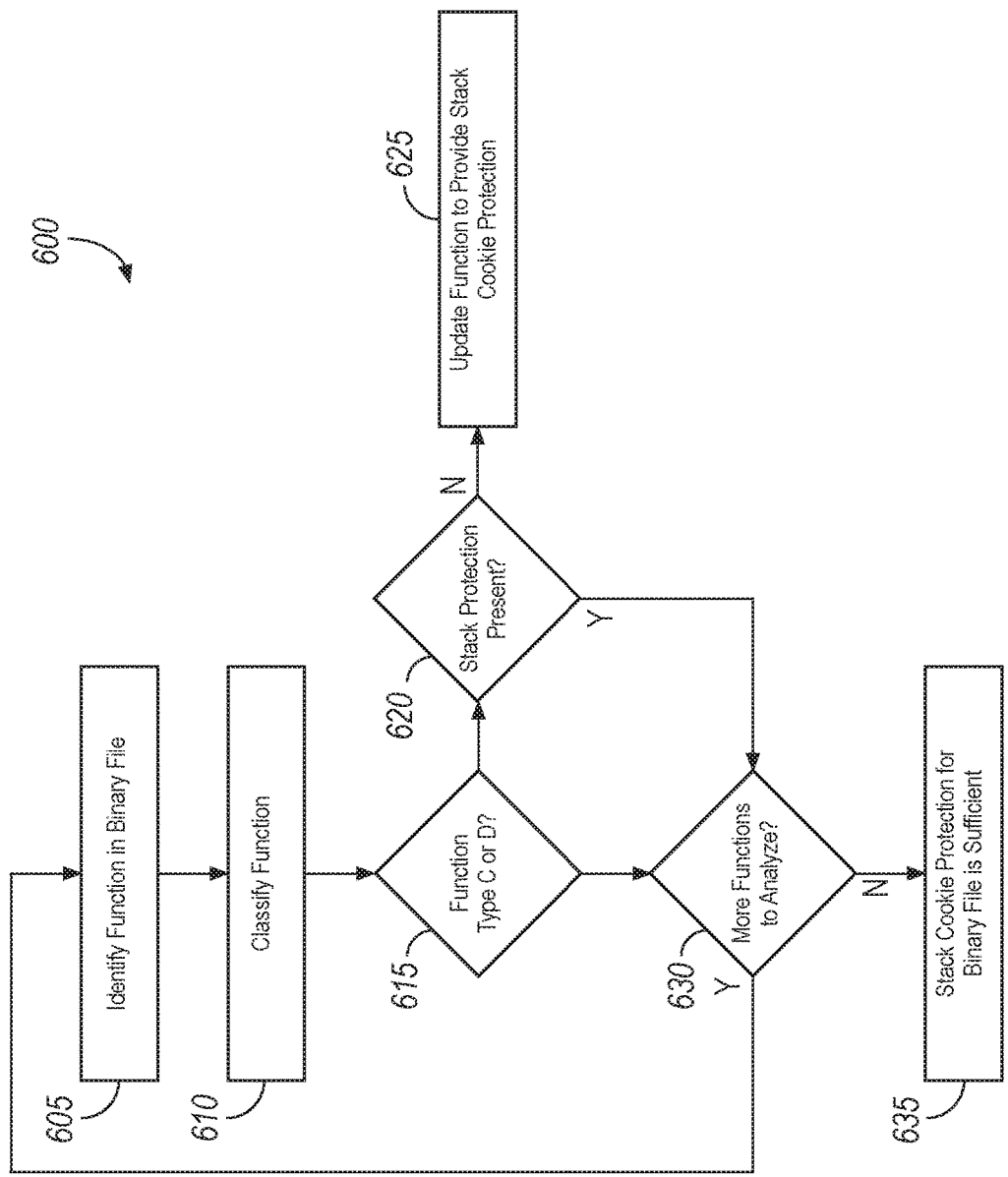
FIG. 6 is a flowchart of an example process that may be executed by the computer to evaluate binary files for security risk.

FIG. 6 is a flowchart of an example process 600 that may be implemented by one or more components of the computer 500. The process 600 may be executed by the processor 510 to determine, e.g., if the stack protection for an analyzed binary file 515 is sufficient.

At block 605, the computer 500 identifies a function in the binary file 515. During an initial execution of the process 600, the processor 510 may identify the first function appearing in the binary file 515. During subsequent iterations of the process 600, the processor 510 may identify the function in the binary file 515 that follows the function identified the previous time block 605 was executed. In other words, during the first iteration of block 605, the processor 510 may identify the first function in the binary file 515, during the second iteration of block 605, the processor 510 may identify the section function in the binary file 515, and so on.

At block 610, the computer 500 classifies the function. That is, the processor 510 may be programmed to classify the function according to the types discussed above. The type A classification may be assigned to functions that are not vulnerable to stack overflow. As such, type A functions may not require stack protection. The type B classification may be applied to functions identified by the developer as including stack protection. For instance, the developer may set an attribute indicating that the function should be classified under type B. The type C classification may apply to functions that contain a local character array. The type D classification may apply to functions with one or more of the following characteristics: a local variable's address is used as part of the right hand side of an assignment or function argument, a local variable is an array (or union containing an array) regardless of the array type or length, or the function uses register local variables. The processor 510 may be programmed to analyze the function and assign, e.g., one of the foregoing classifications to the function.

At decision block 615, the computer 500 determines the function type based on the classification at block 610. For example, the processor 510 may determine whether the function is type C or type D. If the processor 510 determines that the function classification is type C or type D, the process 600 may proceed to block 620. Otherwise, the process 600 may proceed to block 630.

At decision block 620, the computer 500 determines whether stack protection is present for the function. That is, the processor 510 may analyze the function to determine whether the function incorporates stack cookie protection, which as previously explained, involves placing a special value or "cookie" on the stack at a boundary between a function's local data and information (such as the return address) used to maintain the organization of the stack. If the processor 510 determines that the function incorporates stack cookie protection, the process 600 may proceed to block 630. If the function does not implement stack cookie protection, the process 600 may proceed to block 625.

At block 625, the computer 500 recommends that the function be updated to implement stack cookie protection. For example, the processor 510 may be programmed to update the risk assessment file 525 to indicate that the function should be updated to implement stack cookie protection. In some instances, the processor 510 may output an indication to a display device indicating that the function analyzed during the latest iteration of block 605 should be updated with stack cookie protection. Further, in some implementations, the process 600 ends after block 625 so that the function can be updated with stack cookie protection. The process 600 may resume after, e.g., the binary file 515 is compiled with the updated function.

At decision block 630, the computer 500 determines if other functions remain to be analyzed in the binary file 515. If the processor 510 determines that other functions remain (e.g., the processor 510 determines that it has not yet analyzed all of the functions appearing in the binary file 515), the process 600 may proceed to block 605. If the processor 510 determines that all functions in the binary file 515 have been analyzed, the process 600 may proceed to block 635.

At block 635, the computer 500 may determine that the stack protection is sufficient. For example, the processor 510 may be programmed to update the risk assessment file 525 to indicate that the stack cookie protection for the binary file 515 is sufficient. In some instances, the processor 510 may output an indication to a display device indicating that the binary file 515 is sufficiently protected. Further, in some implementations, the process 600 ends after block 635. The process 600 may resume after, e.g., a new binary file 515 is presented to the computer 500 for stack cookie protection analysis.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or hand-held computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computer comprising:
a memory; and
a processor programmed to execute instructions stored in the memory, the instructions including identifying a function in a compiled binary file, assigning one of a plurality of classifications to the function, determining that the function requires stack cookie protection based at least in part on the classification assigned to the function, determining, based on a binary static analysis of the function, that the function does not incorporate stack cookie protection, updating the function to incorporate stack cookie protection, resulting in an updated function, and compiling source code with the updated function, resulting in an updated compiled binary file.

2. The computer of claim 1, wherein assigning one of a plurality of classifications to the function includes assigning a first classification or a second classification to the function.

3. The computer of claim 2, wherein determining that the function requires stack cookie protection includes determining that the function requires stack cookie protection as a result of determining that the function is assigned the first classification.

4. The computer of claim 2, the instructions further comprising determining that the function does not require stack cookie protection as a result of determining that the function is assigned the second classification.

5. The computer of claim 2, wherein the first classification is assigned to the function as a result of determining that the function has a local character array.

6. The computer of claim 2, wherein the first classification is assigned to the function as a result of determining that the function has a local variable address appearing on a right hand side of an assignment or function argument.

7. The computer of claim 2, wherein the first classification is assigned to the function as a result of determining that the function has a local variable in an array or union containing an array.

8. The computer of claim 2, wherein the first classification is assigned to the function as a result of determining that the function uses register local variables.

9. The computer of claim 2, wherein the second classification is assigned to the function as a result of determining that the function is not vulnerable to stack overflow.

10. The computer of claim 2, wherein the second classification is assigned to the function as a result of determining that the function contains a stack protection attribute.

11. A method comprising:
identifying a first function and a second function in a compiled binary file;
assigning a first classification to the first function;
assigning a second classification to the second function;
determining that the first function requires stack cookie protection as a result of the first function being assigned the first classification;
determining that the second function does not require stack cookie protection as a result of the second function being assigned the second classification;
determining, based on a binary static analysis of the first function, that the first function does not incorporate stack cookie protection;
updating the first function to incorporate stack cookie protection, resulting in an updated first function; and
compiling source code with the updated first function, resulting in an updated compiled binary file.

12. The method of claim 11, wherein the first classification is assigned to the first function as a result of determining that the first function has a local character array.

13. The method of claim 11, wherein the first classification is assigned to the first function as a result of determining that the first function has a local variable address appearing on a right hand side of an assignment or function argument.

14. The method of claim 11, wherein the first classification is assigned to the first function as a result of determining that the first function has a local variable in an array or union containing an array.

15. The method of claim 11, wherein the first classification is assigned to the first function as a result of determining that the first function uses register local variables.

16. The method of claim 11, wherein the second classification is assigned to the second function as a result of determining that the second function is not vulnerable to stack overflow.

17. The method of claim 11, wherein the second classification is assigned to the second function as a result of determining that the second function contains a stack protection attribute.

18. A computer comprising:
a memory; and
a processor programmed to execute instructions stored in the memory, the instructions including identifying a first function and a second function in a compiled binary file, assigning a first classification to the first function, assigning a second classification to the second function, determining that the first function requires stack cookie protection as a result of the first function being assigned the first classification, determining that the second function does not require stack cookie protection as a result of the second function being assigned the second classification, determining, based on a binary static analysis of the first function, that the first function does not incorporate stack cookie protection, updating the first function to incorporate stack cookie protection, resulting in an updated first function, and compiling source code with the updated first function, resulting in an updated compiled binary file.

19. The computer of claim 18, wherein the first classification is assigned to the first function as a result of determining one of:
the first function has a local character array;
the first function has a local variable address appearing on a right hand side of an assignment or function argument;
the first function has a local variable in an array or union containing an array; and
the first function uses register local variables.

20. The computer of claim 18, wherein the second classification is assigned to the second function as a result of determining one of:
the second function is not vulnerable to stack overflow; and
the second function contains a stack protection attribute.

* * * * *